US012664958B2

(12) United States Patent
Kim et al.

(10) Patent No.: US 12,664,958 B2
(45) Date of Patent: Jun. 23, 2026

(54) DATA PROCESSING DEVICE, DATA DRIVING DEVICE AND DISPLAY DEVICE INCLUDING THE SAME

(71) Applicant: LX Semicon Co., Ltd., Daejeon (KR)

(72) Inventors: Do Seok Kim, Daejeon (KR); So Hyeon Kim, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 19/013,578

(22) Filed: Jan. 8, 2025

(65) Prior Publication Data

US 2025/0225951 A1 Jul. 10, 2025

(30) Foreign Application Priority Data

Jan. 8, 2024 (KR) ........................ 10-2024-0003186
Jan. 6, 2025 (KR) ........................ 10-2025-0001633

(51) Int. Cl.
*G09G 5/00* (2006.01)

(52) U.S. Cl.
CPC .................................... *G09G 5/008* (2013.01)

(58) Field of Classification Search
CPC .. G09G 5/008; G09G 3/3685; G09G 2370/04; G09G 2370/08; G09G 2370/10; G09G 5/006; G09G 3/20
See application file for complete search history.

(56) References Cited

U.S. PATENT DOCUMENTS

| | | | | |
|---|---|---|---|---|
| 2015/0213779 | A1* | 7/2015 | Baek | G09G 5/008 345/204 |
| 2023/0215317 | A1* | 7/2023 | Kim | G09G 3/20 345/214 |
| 2024/0105105 | A1* | 3/2024 | Pyun | G09G 5/008 |
| 2025/0166552 | A1* | 5/2025 | Lim | G09G 3/3275 |

* cited by examiner

*Primary Examiner* — Bryan Earles
(74) *Attorney, Agent, or Firm* — Birch, Stewart, Kolasch & Birch, LLP

(57) ABSTRACT

The embodiment discloses a data processing device, a data driving device, and a display device, wherein the data processing device transmits configuration data in a low-speed communication mode, transitions to a high-speed communication mode after the low-speed communication mode to transmit control data and image data, and retransmits a clock training pattern while maintaining the high-speed communication mode upon receiving a lock-fail signal during the operation of the high-speed communication mode.

14 Claims, 17 Drawing Sheets

DATA PROCESSING DEVICE, DATA DRIVING DEVICE AND DISPLAY DEVICE INCLUDING THE SAME

CROSS-REFERENCE TO RELATED APPLICATION

This application claims priority to and the benefit of Korean Patent Applications No. 10-2024-0003186, filed on Jan. 8, 2024 and No. 10-2025-0001633, filed on Jan. 6, 2025, the disclosure of which is incorporated herein by reference in its entirety.

BACKGROUND

Field

The embodiment relates to a technology for driving a display device.

Description of Related Art

The display panel consists of a plurality of pixels arranged in a matrix form. Each pixel may have colors such as red (R), green (G), and blue (B) and displays an image on the display panel by emitting light in greyscale according to the image data.

The image data is transmitted from a data processing device, such as a timing controller, to a data driving device, such as a source driver. The image data is transmitted as digital values, and the data driving device converts the image data into analog voltages to drive each pixel.

Since the image data individually or independently specifies the greyscale value of each pixel, the amount of image data increases as the number of pixels arranged on the display panel increases. Furthermore, as the frame rate increases, the amount of image data that must be transmitted per unit time also increases.

Recently, with the resolution of display panels increasing, both the number of pixels arranged on the display panel and the frame rate are rising, and to handle the increased amount of image data resulting from high resolution, data communication within the display device is being accelerated.

In such high-speed communication interfaces, when external noise, such as noise in the transmission channel or ESD, is applied, signal distortion may occur, causing the data driving device to restore abnormal data. Therefore, the data processing device needs to quickly restore the communication state to ensure normal data communication.

SUMMARY

One embodiment provides a data driving device, a data processing device, and a display device including the same, which are capable of quickly restoring the communication state when a lock-fail occurs.

Objects of the present disclosure are not limited to the aforementioned objects, and other objects not mentioned may be clearly understood by those skilled in the art from the following description.

A data processing device according to one aspect of the present disclosure is configured to transmit configuration data in a low-speed communication mode, to change to a high-speed communication mode after the low-speed communication mode to transmit control data and image data, and to retransmit a clock training pattern while maintaining the high-speed communication mode upon receiving a lock-fail signal during operation in the high-speed communication mode.

To enter the high-speed communication mode after the low-speed communication mode, a clock training pattern is transmitted, and if a lock-fail signal is received after receiving a lock signal indicating the completion of training for the clock training pattern and during the transmission of image data, the clock training pattern may be retransmitted while maintaining the high-speed communication mode.

If the lock signal for the retransmitted clock training pattern is not received within a predetermined time, the low-speed communication mode may be re-executed.

When re-executing the low-speed communication mode, a preamble pattern may be retransmitted.

Before retransmitting the clock training pattern, a recovery start signal may be transmitted, wherein the recovery start signal may be a signal in which a high level and a low level are repeated.

Before retransmitting the clock training pattern, a recovery start signal may be transmitted, wherein the recovery start signal may be a DC signal of either a high level or a low level.

When power is supplied, the low-speed communication mode may be activated to transmit a preamble pattern, followed by the transmission of the configuration data. Upon receiving a lock signal for the preamble pattern, the configuration data may be transmitted, and if the lock signal is continuously received, the high-speed communication mode may be activated.

Upon receiving a lock signal for the clock training pattern, a link training pattern may be transmitted.

A data driving device according to one aspect of the present disclosure is configured to receive configuration data in a low-speed communication mode, to receives control data and image data in a high-speed communication mode after the low-speed communication mode, and, upon detecting a lock-fail during operation in the high-speed communication mode, to transmit a lock-fail signal to the data processing device. The data driving device may perform training by receiving a recovery start signal and a clock training pattern while maintaining the high-speed communication mode.

The data driving device may be configured as a plurality of devices, and each data driving device may include a lock detector.

A display device according to one aspect of the present disclosure may include: a data processing device that transmits configuration data in a low-speed communication mode, transmits control data and image data in a high-speed communication mode after the low-speed communication mode, and retransmits a recovery start signal and a clock training pattern while maintaining the high-speed communication mode upon receiving a lock-fail signal during the high-speed communication mode; and a data driving device that performs training by receiving the recovery start signal and the clock training pattern.

According to the embodiment, the communication state may be quickly restored when a lock-fail occurs in the data driving device.

According to the embodiment, the communication state may be quickly restored by applying the optimal communication state restoration method depending on the timing of the lock-fail occurrence in the data driving device.

The effects of the present disclosure are not limited to the effects mentioned above, and other effects not explicitly mentioned may be clearly understood by those skilled in the art from the description of the claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF EXEMPLARY EMBODIMENTS

Figure 1:
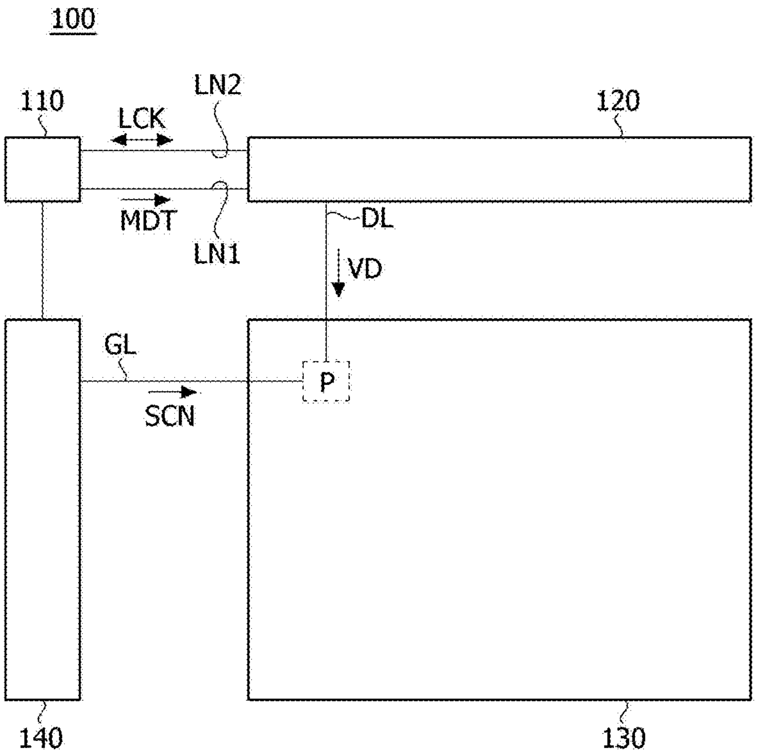
FIG. 1 is a conceptual diagram of a display device according to one embodiment of the present disclosure.

The advantages and features of the present disclosure, and methods of achieving them will be apparent from the embodiments described in detail below in conjunction with the accompanying drawings. However, the present disclosure is not limited to the following embodiments, which may be implemented in various different forms; rather, the present embodiments are provided to make the disclosure of the present disclosure complete and to allow those skilled in the art to fully understand the scope of the present disclosure, and the present disclosure is defined only within the scope of the appended claims.

The shapes, sizes, proportions, angles, numbers and the like shown in the accompanying drawings for the purpose of describing the embodiments of the present disclosure are merely examples, and the present disclosure is not limited thereto. Like reference numerals generally denote like elements throughout the present specification. Further, in describing the present disclosure, detailed descriptions of known related technologies may be omitted so as not to unnecessarily obscure the subject matter of the present disclosure.

The following embodiments are partially or fully coupled or combinable with each other and are technically capable of various interworking and driving. Each of the embodiments may be implemented independently or together in a related relationship.

Hereinafter, various embodiments of the present disclosure will be described in detail with reference to the accompanying drawings.

FIG. 1 is a configuration diagram of a display device according to one embodiment of the present disclosure.

Referring to FIG. 1, the display device 100 may include a data processing device 110, a data driving device 120, a display panel 130, and a gate driving device 140, among others.

The data processing device 110 may receive image data from another device. The other device may be a device that generates image data, such as a host.

The data processing device 110 may process the image data received from another device to be suitable for the data driving device 120 and transmit the processed image data to the data driving device 120. The data processing device 110 may perform digital gamma correction processing on the greyscale values of each pixel included in the image data or may perform compensation processing to match the characteristics of each pixel.

The data driving device 120 may receive image data from the data processing device 110, generate a data voltage VD according to the greyscale value of the pixels included in the image data, and supply the data voltage VD to the pixels P.

A plurality of pixels P may be arranged on the display panel 130. Each pixel P may be connected to the data driving device 120 through a data line DL and to the gate driving device 140 through a gate line GL.

The display panel 130 may be a panel of a flat-panel display device, such as a Liquid Crystal Display (LCD), a Field Emission Display (FED), a Plasma Display Panel (PDP), an Organic Light Emitting Display (OLED), or a Non-Organic Light Emitting Display.

Each pixel P may include a transistor, where the gate terminal of the transistor may be connected to the gate line GL, and the source terminal may be connected to the data line DL. When the gate driving device 140 supplies a scan signal SCN to the gate line GL, the transistor turns on, connecting the data line DL to the pixel P. After the data line DL is connected to the pixel P, the data voltage VD supplied by the data driving device 120 is transmitted to the pixel P.

To synchronize the timing of the gate driving device 140 and the data driving device 120, the data processing device 110 may transmit a timing control signal to the gate driving device 140 and the data driving device 120.

The data processing device 110 may transmit a gate control signal to the gate driving device 140. The gate control signal may include the aforementioned timing control signal. The gate driving device 140 may generate a scan signal SCN based on the gate control signal and supply the scan signal SCN to the pixels P through the gate line GL.

At least two types of communication lines LN1 and LN2 may be arranged between the data processing device 110 and the data driving device 120. The data processing device 110 may transmit a first communication signal MDT through the first communication line LN1 and may transmit or receive a second communication signal LCK through the second communication line LN2.

The first communication line LN1 may be defined as a main communication line, and the second communication line LN2 may be defined as a auxiliary communication line. The first communication signal MDT may be defined as the main communication signal, and the second communication signal LCK may be defined as the auxiliary communication signal.

The data processing device 110 may transmit image data and timing control signals to the data driving device 120 through the main communication signal MDT, and the data driving device 120 may transmit status information to the data processing device 110 via the auxiliary communication signal LCK.

Figure 2:
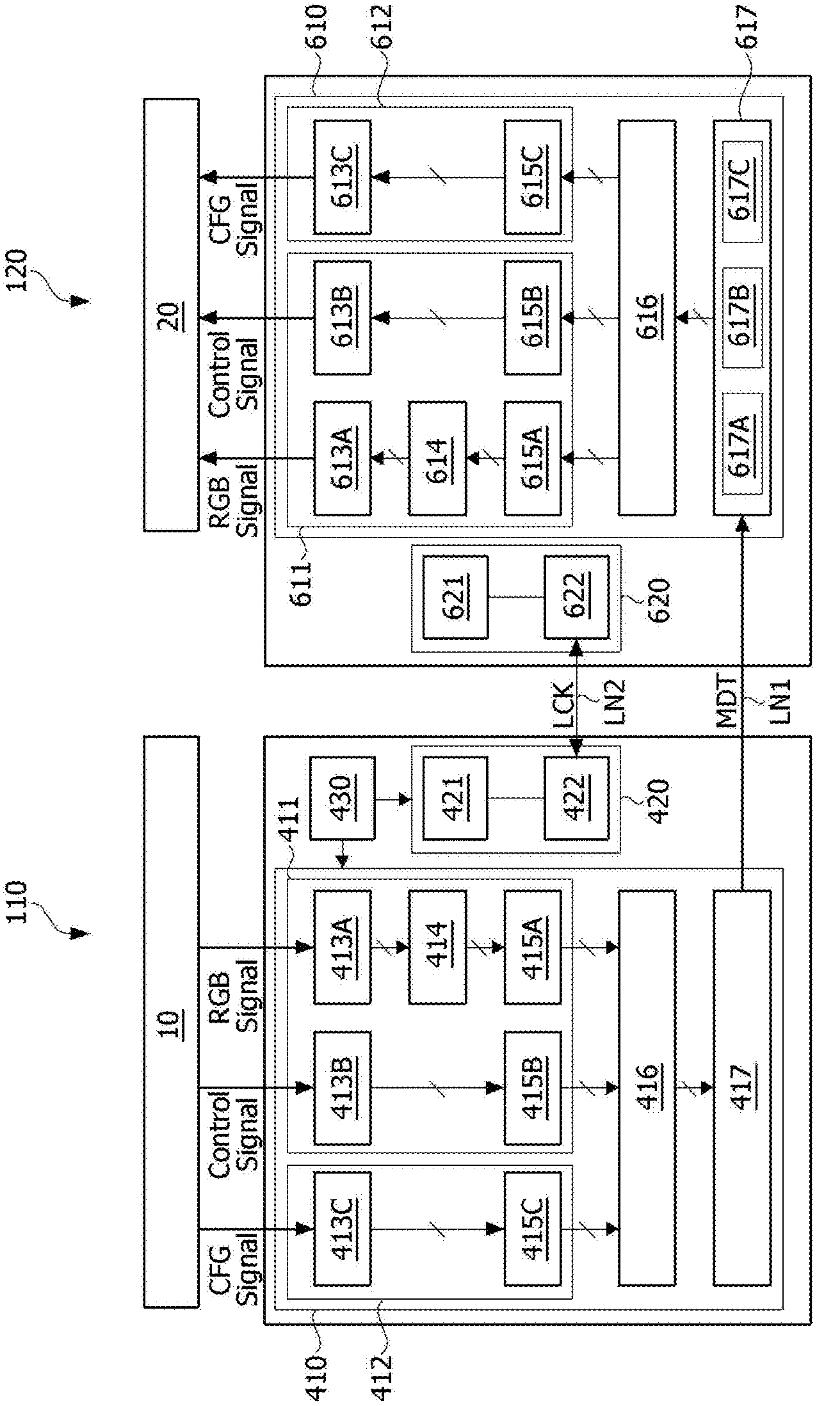
FIG. 2 is a configuration diagram of a data processing device and a data driving device according to one embodiment of the present disclosure.

FIG. 2 is a configuration diagram of a data processing device and a data driving device according to one embodiment.

Referring to FIG. 2, the data processing device 110 may include a first main communication circuit 410 and a first auxiliary communication circuit 420, while the data driving device 120 may include a second main communication circuit 610 and a second auxiliary communication circuit 620. The first main communication circuit 410 may communicate with the second main communication circuit 610, and the first auxiliary communication circuit 420 may communicate with the second auxiliary communication circuit 620.

The first main communication circuit 410 may transmit the main communication signal MDT to the data driving device 120 via the first communication line LN1. The first main communication circuit 410 may transmit image data and first control data during an active period via the first communication line LN1 and may transmit second control data during a blank period.

The data driving device 120 may drive the pixels of the display panel according to the image data. The first control data may include control values applied on a line-by-line or pixel-by-pixel basis to the display panel, while the second control data may include control values applied over longer cycles than line-by-line or pixel-by-pixel, or control values applied on a frame-by-frame basis.

The first main communication circuit 410 may transmit configuration data at a first data rate via the first communication line LN1. Subsequently, the first main communication circuit 410 may transmit image data, first control data, and second control data at a second data rate, higher than the first data rate, via the first communication line LN1. The mode in which communication is performed at the first data rate may be defined as a low-speed communication mode, and the mode in which communication is performed at the second data rate may be defined as a high-speed communication mode.

The first main communication circuit 410 may receive image data, control data, and configuration data, convert the received image data, control data, and configuration data according to different encoding methods, and output the converted data. The first main communication circuit 410 may include a first data converter 411 for converting image data and control data, and a second data converter 412 for converting configuration data. The first data converter 411 and the second data converter 412 may each be defined as a first data conversion circuit and a second data conversion circuit, respectively.

The first data converter 411 may receive image data and control data, convert the received image data and control data according to different encoding methods, and output the converted data. The first data converter 411 may include a first packer 413A, a second packer 413B, a scrambler 414, a first encoder 415A, and a second encoder 415B.

The first packer 413A may receive image data from the data processing circuit 10. The data processing circuit 10 may be an external host or an application processor (AP), but the embodiments of the present disclosure are not limited thereto. For example, the data processing circuit may be a part of the data processing device 110 that receives data from a host.

The first packer 413A and the second packer 413B may each be connected to the data processing circuit 10 via separate lines, allowing them to independently receive data. The data processing circuit 10 may transmit data to the first packer 413A and/or the second packer 413B according to a predefined timeline. However, the embodiments of the present disclosure are not limited thereto. The first packer 413A and the second packer 413B may be connected to the data processing circuit 10 via a single line and receive data in accordance with the predefined timeline.

The first packer 413A may receive image data in the form of a continuous bitstream from the data processing circuit 10, generate image packets with a predefined number of bits, and the second packer 413B may receive first control data and/or second control data from the data processing circuit 10 to generate control packets with a predefined number of bits. The image packets may also be referred to as first data packets, image data packets, or image packet data, and the control packets may also be referred to as second data packets, control data packets, or control packet data.

The image packets packaged by the first packer 413A and the control packets packaged by the second packer 413B may have different bit counts. For example, one image packet may be packaged into 12 bits, while one control packet may be packaged into 3 or 4 bits. However, the embodiments of the present disclosure are not limited thereto. For example, the bit counts of the image packets and control packets may also be packaged into the same number of bits.

The scrambler 414 may scramble the data of the image packets. Scrambling is the process of shuffling each bit of the transmitted data to prevent identical bits from being arranged consecutively K times (where K is a natural number equal to or greater than 2) in the transmitted data stream. Scrambling is performed according to a predefined protocol, and based on this predefined protocol, the data driving device 120 may restore the scrambled bit stream to its original data.

The first encoder 415A and the second encoder 415B may encode data according to a predefined method. The first encoder 415A may encode image data. The first encoder 415A may encode the boundary bits of adjacent data packets to have opposite polarities. For example, if the last bit of a first data packet and the first bit of a second data packet are both '0,' the first bit of the second data packet may be encoded as '1.' Thus, toggling always occurs at the boundary of data packets, satisfying a predefined run length. However, the embodiments of the present disclosure are not limited thereto. For example, the first encoder 415A may encode the data packet using a line coding method such as 8B10B.

The second encoder 415B may encode control data. The second encoder 415B may encode the original bits of a data packet into multiple redundancy bits with the same polarity and a transition bit with a different polarity. For example, if the bits of a data packet are '110,' the second encoder 415B may encode them as '1110 1110 0001,' with three redundancy bits and one transition bit. As a result, the number of bits in the control data may increase due to encoding. However, the embodiments of the present disclosure are not limited thereto. For example, the second encoder 415B may use various encoding methods to facilitate sampling by the clock data recovery part.

The second data converter 412 may include a third packer 413C and a third encoder 415C. The third packer 413C may receive configuration data from the data processing circuit 10 and generate configuration packets in accordance with a predefined number of bits. The configuration packets may also be referred to as third data packets, configuration data packets, or configuration packet data.

The configuration data, transmitted at a low speed, may include the configuration values of the data driving device 120 required before high-speed communication. For example, the configuration data may include configuration values for the circuits in the data driving device 120 that perform high-speed communication.

The third encoder 415C may encode the configuration packets, packaged by the third packer 413C, according to a predefined method. The third encoder 415C may encode the configuration packets into DC-balanced codes. For example, the third encoder 415C may encode the configuration packets using Manchester coding or 8B10B coding, but the embodiments of the present disclosure are not limited thereto.

The first data output circuit 416 may receive data packets from the first encoder 415A, the second encoder 415B, and the third encoder 415C and transmit the appropriate data to the serializer 417 based on the mode. For instance, in the configuration mode, the first data output circuit 416 may transmit configuration data to the serializer 417, while in the display mode, it may transmit image data and control data to the serializer 417.

The data transmitted in parallel from the first data output circuit 416 may be converted into a serial format by the serializer 417. The serializer 417 may transmit the serialized data to the data driving device 120. In this case, the series of data transmitted in serial form may create a transmission stream, which may take the form of a main communication signal MDT. The first data output circuit 416 and the serializer 417 may constitute a transmitter, which may also be referred to as a transmission circuit or transmission logic.

The main communication signal MDT may be an embedded clock signal. Since the clock is embedded within the main communication signal, the data driving device 120 may require clock training during the initial phase of communication.

The data processing device 110 may include a first auxiliary communication circuit 420, which may comprise a first auxiliary control circuit 421 and a first auxiliary signal processing circuit 422.

The first auxiliary signal processing circuit 422 may receive a auxiliary communication signal LCK from the second communication line LN2 or transmit the auxiliary communication signal LCK via the second communication line LN2.

The first auxiliary control circuit 421 may verify the auxiliary communication signal LCK received from the second communication line LN2. If the auxiliary communication signal LCK indicates an abnormality in the data driving device 120, the first auxiliary control circuit 421 may transmit a signal of the same type as the auxiliary communication signal LCK to the second communication line LN2.

The data driving device 120 may include a second main communication circuit 610 and a second auxiliary communication circuit 620.

The second main communication circuit 610 may receive the main communication signal MDT via the first communication line LN1. The second main communication circuit 610 may receive image data and first control data during the active period via the first communication line LN1 and may receive second control data during the blank period. The data driving circuit 20 may drive the pixels of the display panel based on the image data and control data.

The second main communication circuit 610 may receive configuration data at a first data rate via the first communication line LN1. Additionally, the second main communication circuit 610 may receive image data, first control data, and second control data at a second data rate, which is higher than the first data rate, via the first communication line LN1.

The second main communication circuit 610 may include a deserializer 617, a second data output circuit 616, a third data converter 611, and a fourth data converter 612. The deserializer 617 and the second data output circuit 616 may constitute a receiver or reception circuit.

The deserializer 617 may convert the serially received main communication signal MDT via the first communication line LN1 into a parallel format, either byte-by-byte or symbol-by-symbol.

The deserializer 617 may include an RX receiver 617A, a clock data recovery part 617B, and a parallelizer 617C. The RX receiver 617A may adjust the signals received from the data processing device. The RX receiver 617A may transmit the signals passed through the first communication line LN1 to the clock data recovery part 617B.

Distortion may occur in the signal passing through the first communication line LN1, and the signal passing through the first communication line LN1 may experience high-frequency component attenuation and inter-symbol interference (ISI). The RX receiver 617A may regenerate the high-frequency components, thereby reducing inter-symbol interference.

The clock data recovery part 617B may perform clock training on signals that include a training pattern. The clock data recovery part 617B may restore the clock through clock training. The clock data recovery part 617B may then restore data using the restored clock and, if the restored data matches the reference data, the restored clock may be used for communication with the data processing device.

The clock data recovery part 617B may receive clock training pattern signals as an input, generate output signals, and invert the lock signal from a low logic level to a high logic level when the phase and frequency of the output match the input clock. After this inversion, the clock data recovery part 617B may restore the clock and generate multi-phase internal clocks. The clock data recovery part

617B may utilize a phase-locked loop (PLL) method but may also output multi-phase internal clocks using a delay-locked loop (DLL).

The clock data recovery part 617B may synchronize the rising edges of the multi-phase internal clocks with each bit of control data packets and image data packets to restore the bits of the control and image data.

The parallelizer 617C may convert serial data into parallel data. The parallelizer 617C may receive the clock restored by the clock data recovery part 617B and use it to parallelize the data received from the data processing device 110.

The second data output circuit 616 may transmit the parallel data, converted by the deserializer 617, to the third data converter 611 and the fourth data converter 612 according to the mode. For example, in the configuration mode, it may transmit configuration data to the third decoder 615C. In the display mode, it may transmit image data to the first decoder 615A or control data to the second decoder 615B.

The third data converter 611 may include the first decoder 615A, the second decoder 615B, a descrambler 614, the first unpacker 613A, and the second unpacker 613B.

The first decoder 615A may decode image data, and the second decoder 615B may decode control data. The first decoder 615A may decode the image data in reverse order of the encoding performed by the first encoder 415A. Similarly, the second decoder 615B may decode the control data in reverse order of the encoding performed by the second encoder 415B. For instance, the second decoder 615B may extract only the second bit of every four bits from each control packet. For example, if the control packet bits are [111011100001], the second decoder 615B may decode them into by extracting only the second bit of every four bits.

The descrambler 614 may restore scrambled data to its original state according to a predefined protocol. The descrambler 614 may be synchronized with the scrambler 414 to restore the scrambled data.

The first unpacker 613A may organize the image data on a pixel-by-pixel basis and transmit the image data for each pixel to the data driving circuit 20. The second unpacker 613B may restore the control data to its original form and transmit it to the data driving circuit 20.

The fourth data converter 612 may include the third decoder 615C and the third unpacker 613C. The third decoder 615C may restore configuration data encoded in Manchester code. The third unpacker 613C may receive the configuration data and transmit the configuration values included in the configuration data to the data driving circuit.

The second auxiliary communication circuit 620 may include a second auxiliary control circuit 621 and a second auxiliary signal processing circuit 622.

The second auxiliary control circuit 621 may identify abnormal states of the main communication signal MDT, the main communication circuit, and/or other components, and generate status signals.

The second auxiliary signal processing circuit 622 may generate an auxiliary communication signal LCK using the status signal or feedback signal and transmit the auxiliary communication signal LCK via the second communication line LN2.

The data driving device 120 according to the embodiment may include a main control circuit 430. The main control circuit 430 may receive control signals from the data processing circuit 10 and control components such as the first data converter 411, the second data converter 412, and the first data output circuit 416. However, the embodiments of the present disclosure are not limited thereto.

Figure 3:
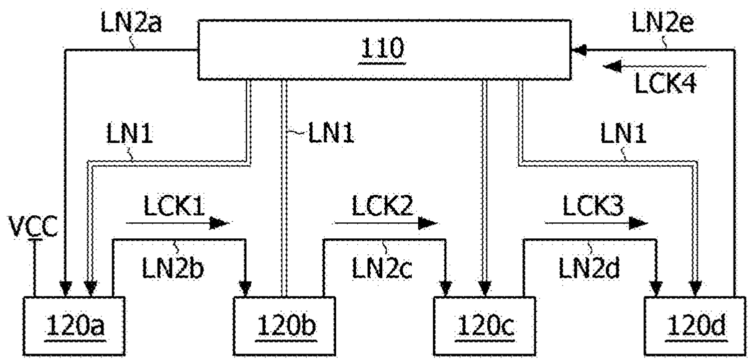
FIG. 3 is a diagram illustrating the main communication and auxiliary communication between a data processing device and a data driving device according to one embodiment of the present disclosure.
Figure 4:
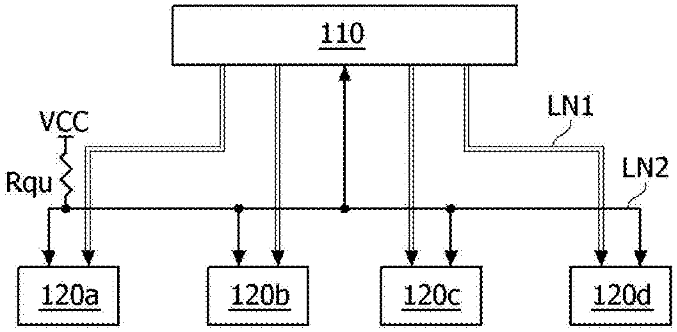
FIG. 4 is a diagram illustrating the main communication and auxiliary communication between a data processing device and a data driving device according to another embodiment of the present disclosure.

FIG. 3 illustrates the main communication and auxiliary communication between the data processing device and the data driving device according to one embodiment of the present disclosure. FIG. 4 illustrates the main communication and auxiliary communication between the data processing device and the data driving device according to another embodiment of the present disclosure.

Referring to FIG. 3, the data driving device may be composed of a plurality of data driving devices 120*a*, 120*b*, 120*c*, and 120*d*. The plurality of data driving devices 120*a*, 120*b*, 120*c*, and 120*d* may be source drivers or data driving integrated circuits. The data processing device 110 may communicate with the plurality of data driving devices 120*a*, 120*b*, 120*c*, and 120*d* via the first communication line LN1. The first communication line LN1 may be connected to each of the data driving devices 120*a*, 120*b*, 120*c*, and 120*d* on a one-to-one basis.

Each first communication line LN1 may be composed of m (where m is a natural number) electrically isolated lines. The m lines may form pairs, with each pair enabling Low Voltage Differential Signaling (LVDS) communication. However, this embodiment is not limited thereto. The data processing device may transmit data in the LVDS method when the data driving device may receive the transmission data in the LVDS method, and may output the transmission data in the CML method when the data driving device may receive the data in the current mode logic (CML) method.

The data processing device 110 and the plurality of data driving devices 120*a*, 120*b*, 120*c*, and 120*d* may transmit and receive information via the second communication line LN2.

Among the plurality of data driving devices 120*a*, 120*b*, 120*c*, and 120*d*, the second communication line LN2 may be connected in a cascade configuration, forming a plurality of lock lines. The first data driving device 120*a* may receive signals from the data processing device 110 via the first lock line LN2*a*. The first data driving device 120*a* and the second data driving device 120*b* may be connected via the second lock line LN2*b*, while the second data driving device 120*b* and the third data driving device 120*c* may be connected via the third lock line LN2*c*. Similarly, the third data driving device 120*c* and the fourth data driving device 120*d* may be connected via the fourth lock line LN2*d*. The fourth data driving device 120*d* may be connected to the data processing device 110 via a feedback line LN2*e*.

The first through fourth data driving devices 120*a* to 120*d* may transmit lock signals using the lock lines. A lock signal indicates whether clock training is complete. If the lock signal is at a high level (or low level), it may signify that clock training is complete. Conversely, if the lock signal is at a low level (or high level), it may signify that clock training is incomplete. A lock-fail may indicate either that clock training has not been completed or that the link between the data processing device 110 and the data driving device 120 has been broken.

The fourth data driving device 120*d* may transmit a lock signal to the data processing device 110. The lock signal may represent the communication state of at least one of the first through fourth data driving devices 120*a* to 120*d*. If a lock-fail occurs in at least one of the first through fourth data driving devices 120*a* to 120*d*, the lock signal may switch to a value indicating a communication abnormality.

Referring to FIG. 4, the data processing device 110 and the plurality of data driving devices 120 may be connected in a 1:1 configuration via a plurality of first communication lines LN1. Additionally, the data processing device 110 and the plurality of data driving devices 120 may be connected via a second communication line LN2, configured as a common bus.

The second communication line LN2 may be a single signal line driven in an open-drain configuration. A pull-up resistor Rqu may be connected to the second communication line LN2, where one side of the pull-up resistor Rqu is connected to the second communication line LN2, and the other side is supplied with a driving voltage VCC.

Multiple data driving devices 120*a*, 120*b*, 120*c*, and 120*d* may be connected to the second communication line LN2, enabling a multi-drop configuration through this connection.

The data processing device 110 may transmit image data with an embedded clock to the data driving device 120 via the first communication line LN1. Additionally, the data processing device 110 and the data driving device 120 may transmit and receive various information via the second communication line LN2.

Figure 5:
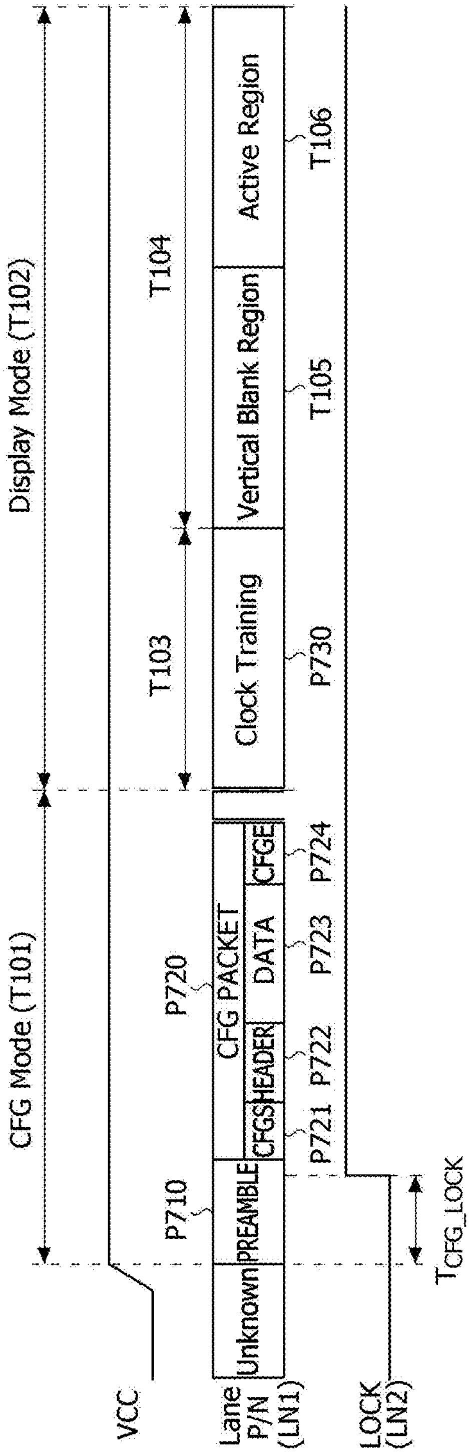
FIG. 5 is a diagram illustrating the sequence of transmission signals according to one embodiment of the present disclosure.

FIG. 5 illustrates the sequence of transmission signals according to one embodiment of the present disclosure.

Referring to FIG. 5, the driving voltage VCC may initially maintain a low-level voltage and then transition to a high-level voltage waveform at a certain point in time. The moment when the driving voltage VCC transitions to a high-level voltage may correspond to the driving point of the display driving device.

After the driving point, the data processing device 110 and the data driving device 120 may operate in the configuration mode (CFG mode, T101). After the operation in the configuration mode T101 is completed, the data processing device 110 and the data driving device 120 may operate in the display mode (T102).

In the configuration mode T101, the data processing device 110 may transmit a preamble packet P710 and a configuration packet P720 via the main communication signal MDT.

While sending the preamble packet P710, the data processing device 110 may change the voltage of the second communication line from a low level to a high level. This voltage change allows the data processing device 110 to notify the data driving device 120 that the preamble packet P710 is being transmitted.

The data driving device 120 may use the preamble packet P710, which consists of a clock training pattern, to train a low-speed communication clock for receiving the configuration packet P720. The preamble packet may be defined as a low-speed clock training pattern or a first clock training pattern.

The data processing device 110 may transmit the preamble packet P710 and the configuration packet P720 at a relatively low first data rate. The low-speed communication clock corresponds to the first data rate, and the data driving device 120 may train the low-speed communication clock using the preamble packet P710.

If the low-speed communication clock is trained within a predefined time TCFG_LOCK, the data driving device 120 may inform the data processing device 110 of the clock training status via the auxiliary communication signal. For example, when the low-speed communication clock is trained, the data driving device 120 may change the voltage of the auxiliary communication signal from a low level to a high level. After confirming through the auxiliary communication signal that the data driving device 120 has trained the low-speed communication clock, the data processing device 110 may transmit the configuration packet P720.

The configuration packet P720 may consist of a start bit, CFGS, P721, a header P722, body data P723, and an end bit, CFGE, P724. It may additionally include error data detection date such as checksum data if necessary.

The header P722 may include parameter values such as data type, mode, identification ID of the receiver, data length, and the receiver's configuration register address. The body data P723 may include configuration information transmitted and received through messages.

The start bit P721 and the end bit P724 may be composed of different data bits. For example, if the start bit P721 corresponds to a binary "0," the end bit P724 may be composed of a binary "1."

After recognizing the end bit P724 via the first communication signal MDT, the data driving device 120 may determine the termination of the configuration mode T101 and transition to the display mode T102 if the first communication signal MDT maintains a voltage level recognizable as a binary "0" or "1." However, the embodiments of the present disclosure are not limited thereto. It may also be determined as the termination of the configuration mode if the level is high or low instead of a recognizable binary "0" or "1."

After the configuration mode T101 ends, the data processing device 110 and the data driving device 120 may transition to the display mode T102. The display mode T102 may be composed of a clock training period T103 and a frame period T104. Once the high-speed communication clock P730 is trained during the clock training period T103, the frame period T104 may repeatedly occur.

During the clock training period T103, the data processing device 110 may transmit a clock training pattern P730 to the data driving device 120 at the second data rate. The data driving device 120 may train the high-speed communication clock corresponding to the second data rate using the clock training pattern P730. Here, the second data rate may have a higher frequency than the first data rate.

If the data driving device 120 fails to train the high-speed communication clock during the clock training period T103, it may send a clock training failure signal via the auxiliary communication signal. For example, the data driving device 120 may lower the voltage of the auxiliary communication signal from a high level to a low level to notify the data processing device 110 of the clock training failure.

In the event of a clock training failure for the high-speed communication clock, the data processing device 110 may send additional clock training patterns or revert to the configuration mode T101.

Once the clock training for the high-speed communication clock is successfully completed, the data processing device 110 and the data driving device 120 may transition to the frame period T104.

The frame period T104 may include an active period T106 and a blank period T105. The active period T106 may be a period during which image data and control data are transmitted on a line-by-line basis, while the blank period T105 may be a period during which line-by-line image data is not transmitted. The blank period T105 may be divided into a horizontal blank period and a vertical blank period.

Figure 6:
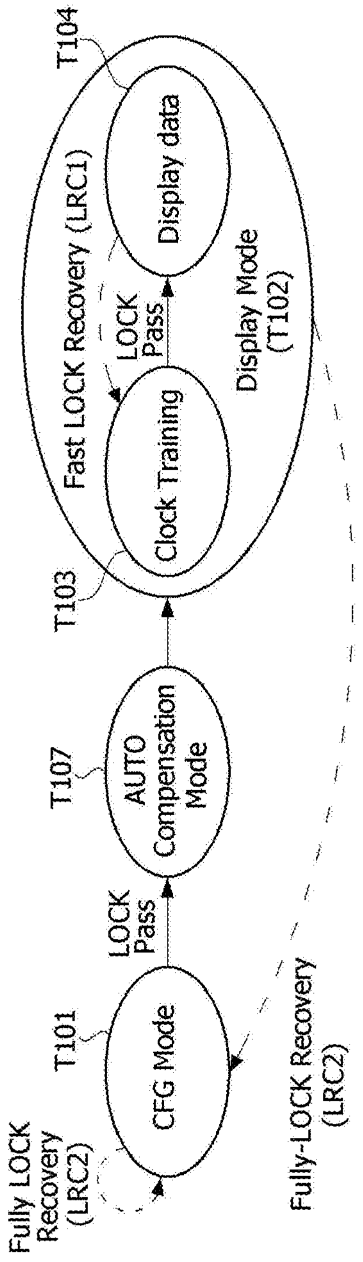
FIG. 6 is a diagram showing a clock recovery sequence according to one embodiment of the present disclosure.

FIG. 6 illustrates a clock recovery sequence according to one embodiment of the present disclosure.

Referring to FIG. 6, the clock recovery mode according to the embodiment may include a first lock recovery mode LRC1, which retrains the clock during a lock-fail in the display mode T102, and a second lock recovery mode LRC2, which reverts to the configuration mode T101 during a lock-fail. The first lock recovery mode LRC1 retains the current mode while retraining the clock, providing the advantage of quickly recovering the communication state.

Generally, performing lock recovery by always returning to the configuration mode T101 and restarting may require a significant amount of time. The embodiment presents multiple lock recovery methods, allowing the selection between the second lock recovery mode LRC2, which involves returning to the configuration mode T101 and retraining with the preamble pattern P710, and the first lock recovery mode LRC1, which involves retraining with the clock training pattern P730.

In particular, when performing the first lock recovery mode LRC1, the sequence does not return to the beginning, allowing for a quick recovery of the communication state and a reduction in the time required to resume normal data reception.

In a display system with a 60 Hz resolution, approximately 16.6 ms is required to output one frame to the screen. In the second lock recovery mode LRC2, the low-speed data transfer time, the transition time to high-speed mode, and the high-speed data transfer time are added, which may take several milliseconds to tens of milliseconds to resume normal screen operation, resulting in the loss of several frames of image data.

However, the first lock recovery mode LRC1 requires only a few hundred microseconds, making it faster than the second lock recovery mode LRC2. This allows for normal screen operation within a few lines of image data.

According to the embodiment, if a lock-fail occurs in the configuration mode, retraining begins from the preamble pattern. However, in the display mode, either the preamble pattern of the configuration mode or the clock training pattern of the display mode may be selectively retrained during a lock-fail. In the display mode, the first lock recovery mode LRC1 and the second lock recovery mode LRC2 may be selectively performed depending on the error condition.

For example, in the display mode, if a lock-fail occurs in the clock data recovery part due to symbol errors such as 8B/10B code errors or data transfer errors caused by a watch-dog timeout, the first lock recovery mode LRC1 may be used to quickly recover the lock through clock training. On the other hand, for cyclic redundancy check (CRC) errors in frame data or line data, or configuration CRC errors, the second lock recovery mode LRC2 may be prioritized. Upon receiving the error message, the data processing device 110 may determine the type of error and determine whether to first proceed with the first lock recovery mode or the second lock recovery mode depending on the type of error.

The auto compensation mode (AUTO Compensation Mode) T107 may be a ready mode performed before entering the display mode. In the auto compensation mode, the display device may optimize the initial conditions of the main link. In the auto compensation mode, the display device may configure the internal circuits of the data driving device to operate at a frequency that enables high-speed data communication between the data processing device and the data driving device. Additionally, the display device may set an equalizer to improve signal quality. The auto compensation mode may also be referred to as AUTO Training Mode.

Figure 7:
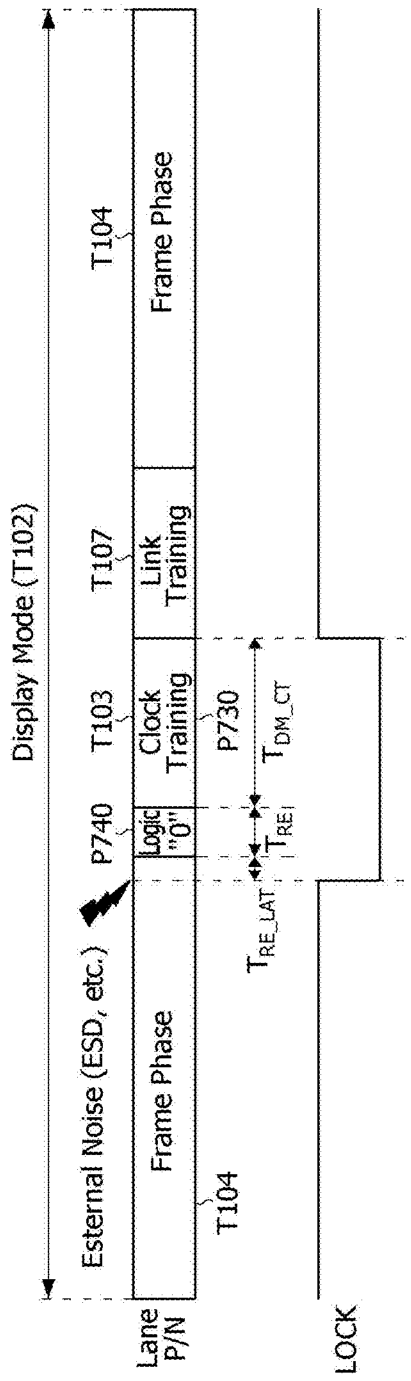
FIG. 7 is a diagram showing a first clock recovery sequence in a display mode according to one embodiment of the present disclosure.
Figure 8:
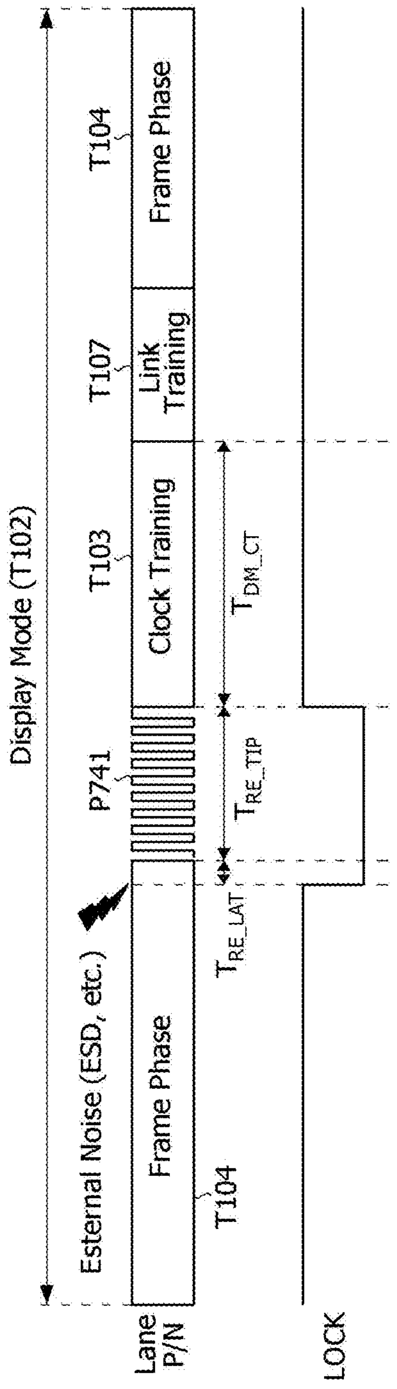
FIG. 8 is a modified example of FIG. 7.

FIG. 7 illustrates a first clock recovery sequence in the display mode according to one embodiment of the present disclosure. FIG. 8 is a variation of FIG. 7.

Referring to FIG. 7, the data processing device 110 may transmit control data and image data at high speed in the display mode T102. During this process, a lock-fail may occur due to external noise such as ESD. If a lock-fail occurs, the data driving device 120 may change the lock signal to a low level.

When the lock signal is changed to a low level, the data processing device 110 may stop transmitting image data and, after a predefined time TRE_LAT has elapsed, may transmit a recovery start signal P740 for a certain period TRE. The recovery start signal P740 may be a low-level DC signal or a bit signal corresponding to a binary '0.' However, the embodiments of the present disclosure are not limited thereto. The data processing device 110 may also transmit a high-level DC signal during a lock-fail.

The data processing device 110 may return to the clock training mode after transmitting a bit signal corresponding to binary '0' and transmit the clock training pattern P730 for a predefined time TDM_CT. At this time, the clock training pattern P730 may be the same pattern as the high-speed clock training pattern transmitted at the start of the display mode T102.

When the data driving device 120 receives a low-level DC signal or a bit corresponding to binary '0' via the first communication line, it may perform training using the subsequently transmitted clock training pattern P730.

Once the clock training is completed, the data driving device 120 may change the lock signal to a high level. When the data processing device 110 detects that the lock signal has been changed to a high level, it may resume transmitting image data.

According to the embodiment, in the case of a lock-fail during the high-speed display mode T102, the communication state may be restored by retraining the clock training pattern P730 while maintaining the display mode T102, without returning to the configuration mode T101.

According to the embodiment, if a lock-fail occurs after the clock training is completed and the system has entered the frame period T104 in the high-speed display mode T102, the system may operate in the first lock recovery mode LRC1. However, if a lock-fail occurs during clock training, the system may re-enter the configuration mode T101 and proceed with the second lock recovery mode LRC2.

A lock-fail occurring during the clock training period T103 indicates a failure in restoring the clock within the clock data recovery part. This may require modifications to the clock data converter and/or equalizer options (EQ Options), necessitating the execution of the second lock recovery mode LRC2. The equalizer option (EQ Option) may be changed by setting the equalizer option to a low value for low-speed data and increasing the option if lock-fail occurs after operation, but is not limited to this. For example, the equalizer option may be changed from a high value to a low value.

A lock-fail occurring during the link training period T107 may indicate a failure to restore the transmission pattern (e.g., insufficient RX PHY margin) and may require modifications to the clock data converter and/or equalizer options (EQ Options). Link training may be additionally performed in the data driving device 120 after clock training is completed to detect symbol boundaries and lock the symbol clock. However, link training may also be omitted.

On the other hand, a lock-fail occurring during the frame period T104 may be caused by input signal loss due to external noise (signals that may not be restored in the RX) and may not be related to the PHY operation characteristics. Therefore, if a lock-fail occurs during the clock training period T103 or the link training period T107 after entering the display mode T102, the system may re-enter the configuration mode T101. However, if a lock-fail occurs during the frame period T104, as no reconfiguration is required, clock training may be performed without changing modes. If the system operates in the first lock recovery mode LRC1 and transmits the clock training pattern P730 but the lock signal does not change to a high level within a predefined period, the system may proceed to the second lock recovery mode LRC2.

According to the embodiment, the first communication line may be configured as a differential signal, and differences in the data sequence may occur depending on whether AC coupling is applied.

Referring to FIG. 8, if the differential signal of the first communication line LN1 includes AC coupling capacitors, the data processing device 110 may transmit a toggle pattern P741 consisting of alternating high and low levels when a lock-fail occurs and the lock signal changes to a low level. This toggle pattern may be recognizable even without a clock data recovery part or equalizer.

In other words, if the first communication line LN1 does not include AC coupling capacitors, the recovery start signal may transmit a binary "0." If the first communication line LN1 includes AC coupling capacitors, the recovery start signal may transmit the toggle pattern P741 for a predefined time TRE_TIP.

Figure 9:
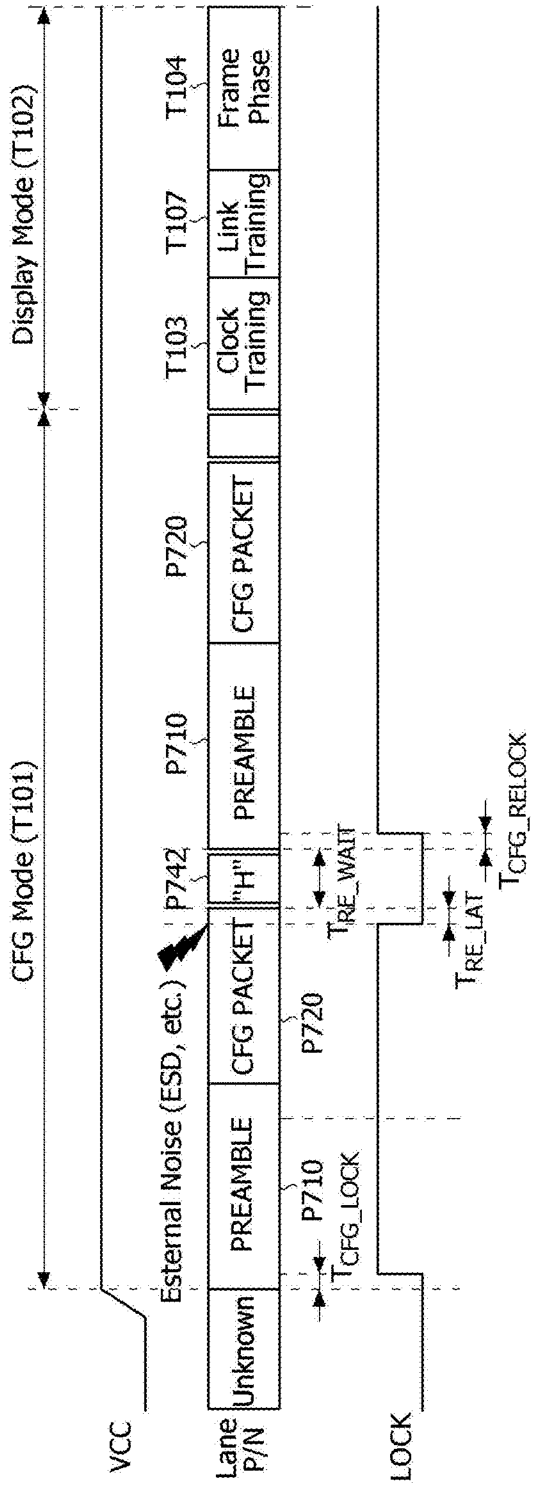
FIG. 9 is a diagram showing a second clock recovery sequence during a lock-fail in a configuration mode according to one embodiment of the present disclosure.
Figure 10:
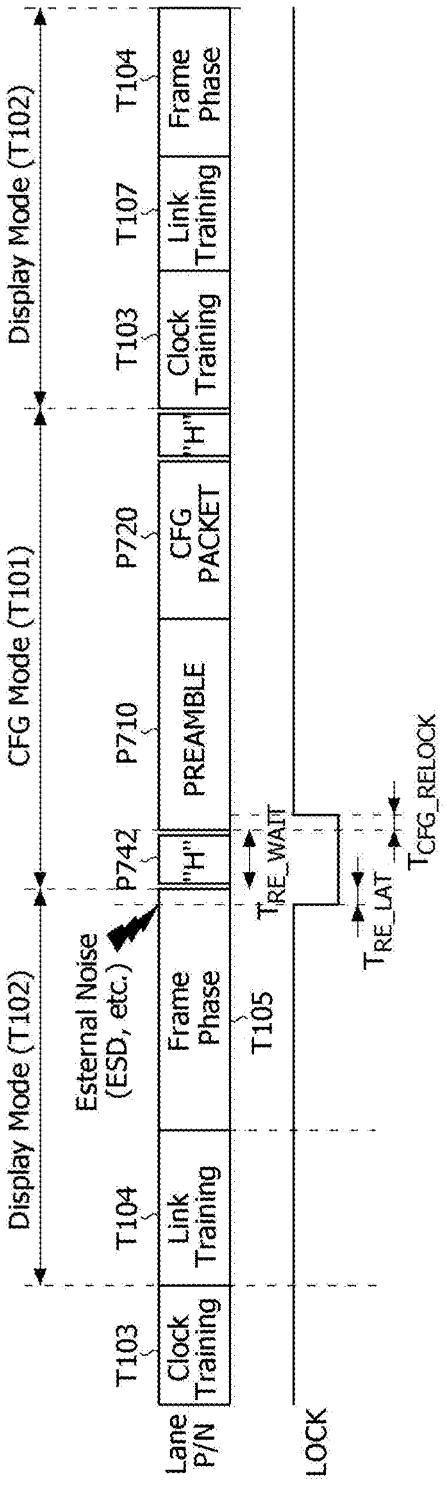
FIG. 10 is a diagram showing a second clock recovery sequence during a lock-fail in a display mode according to one embodiment of the present disclosure.

FIG. 9 illustrates a second clock recovery sequence during a lock-fail in the configuration mode according to one embodiment of the present disclosure. FIG. 10 illustrates a second clock recovery sequence during a lock-fail in the display mode according to one embodiment of the present disclosure.

Referring to FIG. 9, if a lock-fail occurs in the configuration mode T101 or a CRC error is detected during the configuration mode T101, the data driving device 120 may change the lock signal to a low level.

The data processing device 110 may recognize that the lock signal is in a low-level state and, after a predefined delay TRE_LAT, may output a high-level DC level signal or a bit corresponding to binary "1" on the first communication line. If a high-level signal or bit "1" is received on the first communication line during a predefined time TRE_WAIT, the data driving device 120 may recognize that the system is restarting in the configuration mode T101.

The data processing device 110 may restart from the configuration mode T101 and transmit the preamble pattern P710 to the data driving device 120. The data driving device 120 may train using the preamble pattern P710. If the data driving device completes training within a predefined time TCFG_RELOCK, it may change the lock signal to a high level.

Referring to FIG. 10, when a lock-fail occurs in the display mode T102, the data processing device 110 may change the lock signal to a low level.

The data processing device 110 may recognize that the lock signal is at a low level and, after a predefined delay TRE_LAT, transmit a high-level DC signal or a bit corresponding to binary "1" on the first communication line LN1. If a high-level signal is received on the first communication line LN1 during the predefined time TRE_WAIT, the data driving device 120 may recognize that the system is restarting in the configuration mode T101.

In other words, the data driving device 120 may determine that it is operating in the first lock recovery mode LRC1 if a low-level signal (or a bit corresponding to binary "0") is received on the first communication line LN1 for a certain period. Similarly, it may determine that it is operating in the second lock recovery mode LRC2 if a high-level signal (or a bit corresponding to binary "1") is received for a certain period.

The data processing device 110 may restart from the configuration mode T101 and transmit the preamble pattern P710 to the data driving device 120. The data driving device 120 may train using the preamble pattern P710. If the data driving device restores the clock within the predefined time TCFG_RELOCK, it may change the lock signal to a high level.

Figure 11:
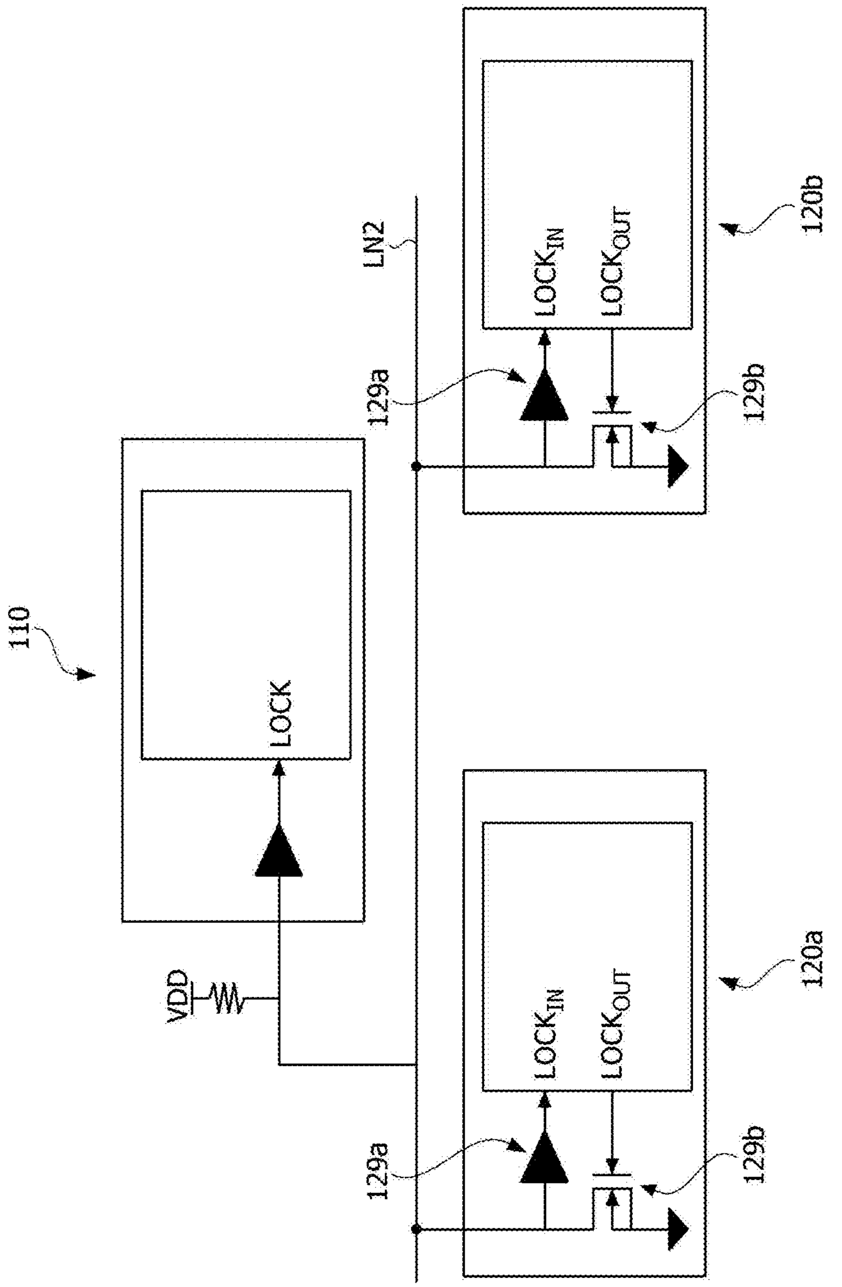
FIG. 11 is a diagram showing the lock monitoring configuration of a data driving device according to one embodiment of the present disclosure.
Figure 12:
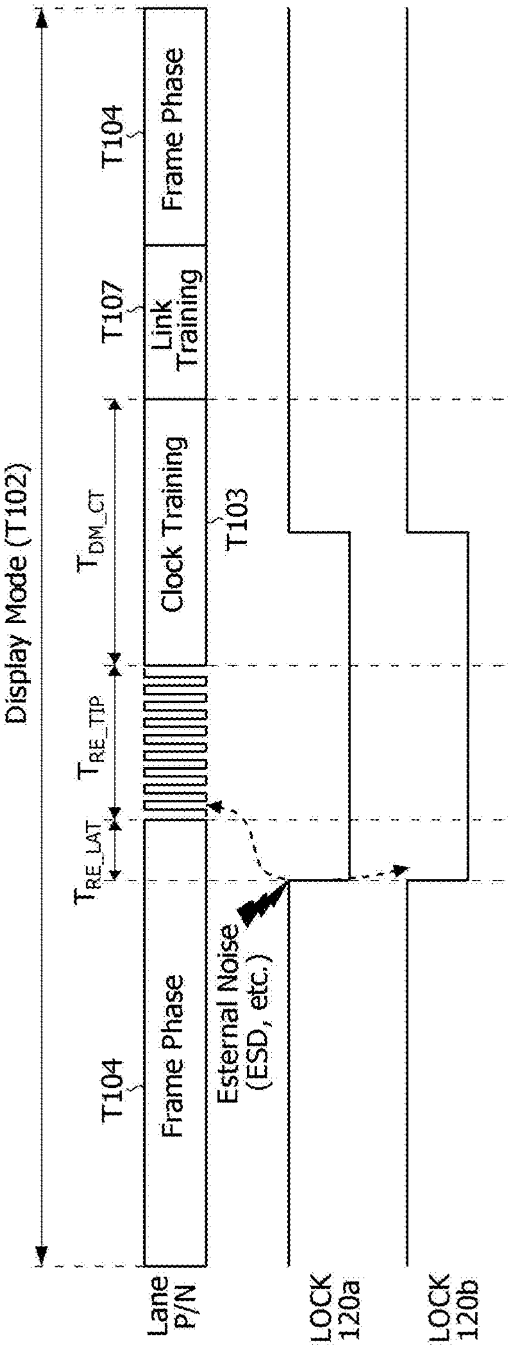
FIG. 12 is a diagram showing the process by which a data driving device equipped with a lock monitoring function quickly detects a lock-fail.
Figure 13:
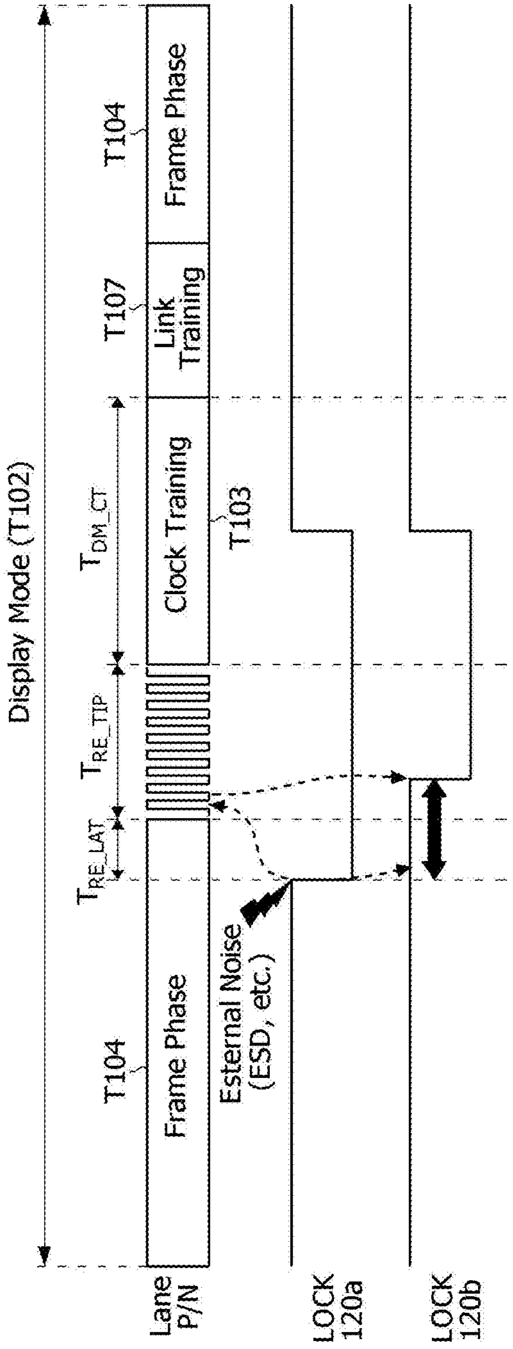
FIG. 13 is a diagram showing the process by which a data driving device without a lock monitoring function detects a lock-fail.

FIG. 11 illustrates the lock monitoring configuration of a data driving device according to one embodiment of the present disclosure. FIG. 12 illustrates the process by which a data driving device equipped with a lock monitoring function quickly detects a lock-fail. FIG. 13 illustrates the process by which a data driving device without a lock monitoring function detects a lock-fail.

Referring to FIG. 11, a lock monitoring technique in a multi-drop topology may be utilized, enabling synchronization of progress states and rapid recognition of lock-fails based on lock signals among a plurality of data driving devices.

In a multi-drop topology, a plurality of data driving devices 120 may control the lock line using an open-drain lock circuit and monitor the external lock line state through lock monitoring. The data driving device 120 may detect the level of the second communication line LN2 through the status receiver 129*a* and change the level of the second communication line LN2 through the status transmitter 129*b*.

The data driving device 120 may perform lock monitoring after its lock signal is at a high level. If the lock signal is at a low-level state, it may be recognized as a lock-fail. Once the data driving device 120 determines a lock-fail, it may transition to a lock recovery sequence.

If a lock monitoring function is not available, additional procedures for pattern reception and recognition are required, and a certain amount of time is needed to determine whether there is a lock abnormality. However, according to the embodiment, if each data driving device 120 is equipped with a lock monitoring function, such issues may be resolved.

Referring to FIG. 12, when utilizing a multi-drop topology, the present disclosure enables precise and rapid lock recovery operations through the lock monitoring technique.

In the lock monitoring method according to the embodiment, the data driving device 120 may determine a lock-fail if either the second communication line or its own lock signal is at a low level, without transmitting a specific pattern. Therefore, there is an advantage of quickly recognizing a lock-fail and quickly performing lock recovery among the data driving devices 120.

Additionally, due to the characteristics of the multi-drop topology, the data processing device 110 may also quickly recognize a lock-fail, enabling the rapid restoration of the communication state.

According to the embodiment, if a lock-fail occurs in the first data driving device 120*a* among a plurality of data driving devices 120, the second data driving device 120*b* and the third data driving device 120*c* may recognize the lock-fail in real-time and switch their lock signals to a low level. If the lock-fail of the first data driving device 120*a* occurs in the display mode T102 and is handled using the first lock recovery mode, the second data driving device 120*b* and the third data driving device 120*c* may also perform the first lock recovery mode.

If the lock-fail of the first data driving device 120*a* occurs in the configuration mode T101 and is handled using the second lock recovery mode, the second data driving device 120*b* and the third data driving device 120*c* may also perform the second lock recovery mode.

According to the embodiment, if a lock-fail occurs in one data driving device 120 and it performs the first lock recovery mode or the second lock recovery mode, the other data driving devices 120 may also perform the same lock recovery mode.

Referring to FIG. 13, when the data driving device 120 does not have a lock monitoring configuration, the data processing device 110 may recognize the lock-fail and synchronize the data driving devices 120 by transmitting a specific pattern to retrain the clock. However, this method results in differing lock-fail recognition timings among the data driving devices 120, causing slower synchronization. Consequently, some data driving devices 120 may experience delayed lock recovery.

Figure 14:
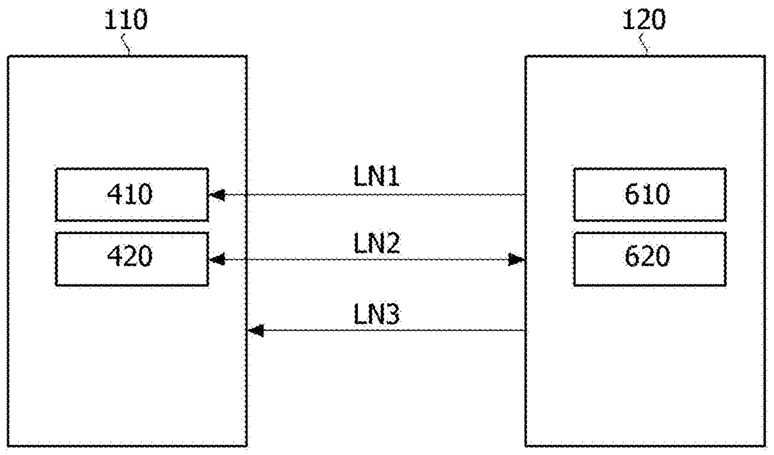
FIG. 14 is a diagram illustrating the main communication and auxiliary communication between a data processing device and a data driving device according to another embodiment of the present disclosure.

FIG. 14 illustrates the communication lines between the data processing device and the data driving device according to another embodiment of the present disclosure.

Referring to FIG. 14, the communication lines between the data processing device 110 and the data driving device 120 may include the first communication line LN1, the second communication line LN2, and the third communication line LN3. The third communication line LN3 may be a hot plug detect (HPD) line. The HPD line may be a signal line for the data processing device 110 to detect the interface connection with the data driving device 120. For instance, when the data processing device 110 and the data driving device 120 are connected via the HPD line, the data processing device 110 may detect the interface connection with the data driving device 120 and prepare for communication based on the protocol with the data driving device 120.

The second communication line LN2 may be used to transmit and receive various configuration information necessary for communication between the data processing device 110 and the data driving device 120. Additionally, based on the signals detected through the second communication line LN2, the data driving device 120 may determine whether it is in a state capable of communication.

Figure 15:
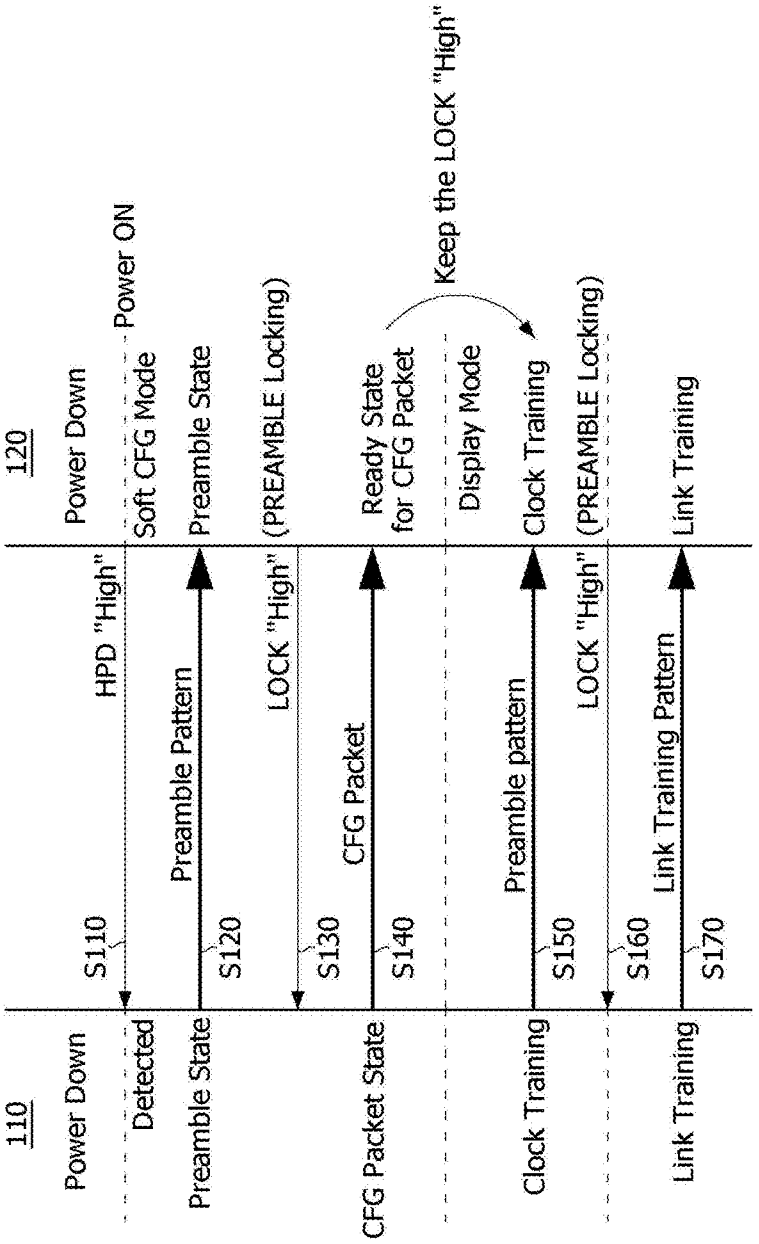
FIG. 15 is a diagram showing the data flow of a data processing device and a data driving device according to another embodiment of the present disclosure.
Figure 16:
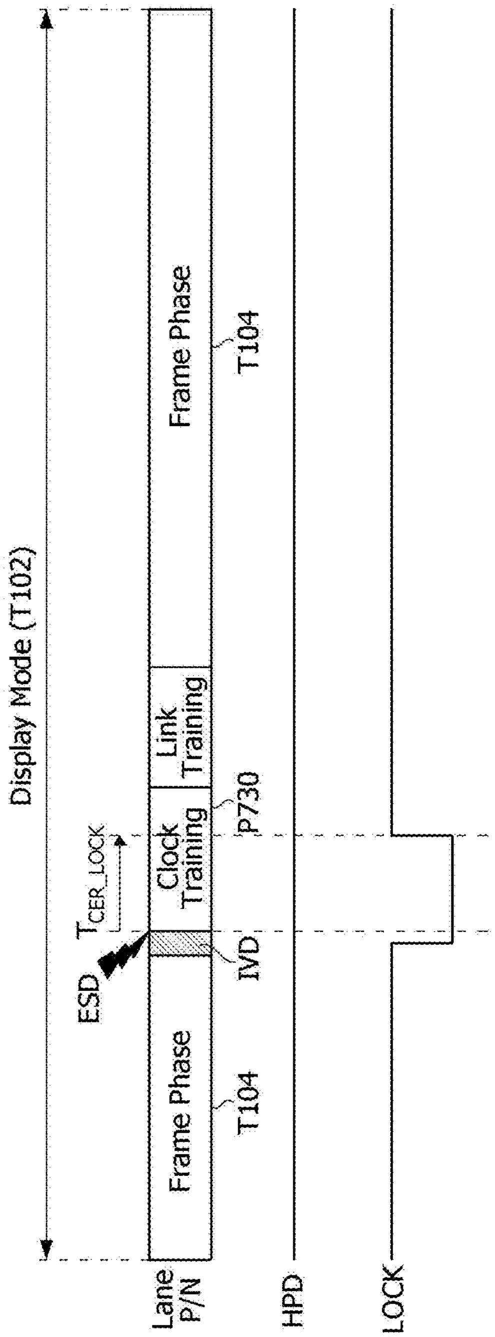
FIG. 16 is a diagram showing a first clock recovery sequence during a lock-fail in a display mode according to another embodiment of the present disclosure.

FIG. 15 illustrates the data flow between the data processing device and the data driving device according to another embodiment of the present disclosure. FIG. 16 illustrates the first clock recovery sequence during a lock-fail in the display mode according to another embodiment of the present disclosure.

Referring to FIG. 15, when power is turned on for both of the data processing device 110 and the data driving device 120, the data driving device 120 may change the HPD signal to a high level and transmit it through the third communication line LN3 (S110). Subsequently, the data processing device 110 may transmit a preamble pattern P710 (S120), and the data driving device 120 may change the second communication line to a high level upon completing the training of the preamble pattern P710 (S130).

When the second communication line is changed to a high level, the data processing device 110 may transmit a configuration packet (S140), and the data driving device 120 may complete its configuration based on the configuration packet.

Thereafter, in the display mode T102, the data processing device 110 may transmit a clock training pattern P730 (S150). Once the training of the clock training pattern P730 is completed, the data processing device 110 may maintain the lock signal at a high level (S160).

The data processing device 110 may then transmit a link training pattern (S170). Once the training of the link training pattern is completed, the data driving device 120 may maintain the lock signal at a high level.

Referring to FIG. 16, control data and image data may be transmitted in the high-speed display mode T102. During this process, a lock-fail may occur due to external noise, such as ESD. In the event of a lock-fail, the data driving device 120 may maintain the HPD signal at a high level and change the lock signal to a low level.

The data processing device 110 may detect that the HPD signal remains at a high level while the lock signal has been changed to a low level. After completing the transmission of erroneous data caused by ESD (IVD), it may transmit the clock training pattern P730. At this time, the clock training pattern P730 may be the same as the high-speed clock training pattern transmitted at the start of the display mode T102.

The data driving device 120 may perform training using the clock training pattern P730. If the clock training is completed within a predefined period TCER_LOCK, the data driving device 120 may change the lock signal to a high level. Once the data processing device 110 detects that the lock signal has been changed to a high level, it may resume transmitting image data.

Figure 17:
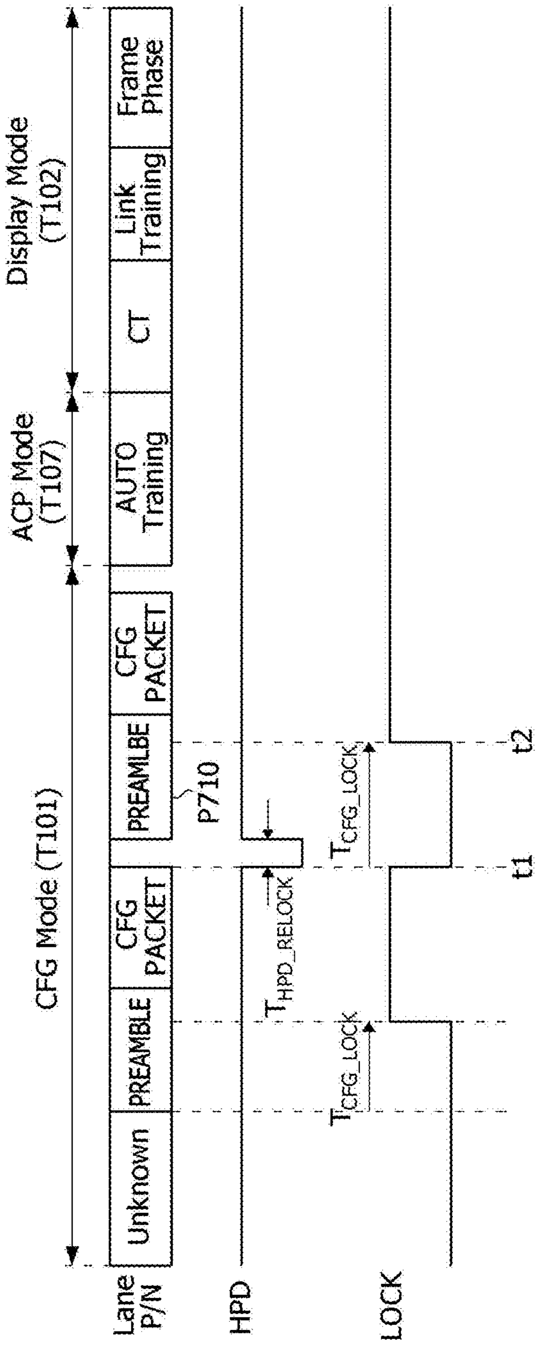
FIG. 17 is a diagram showing a second clock recovery sequence during a lock-fail in a configuration mode according to another embodiment of the present disclosure.
Figure 18:
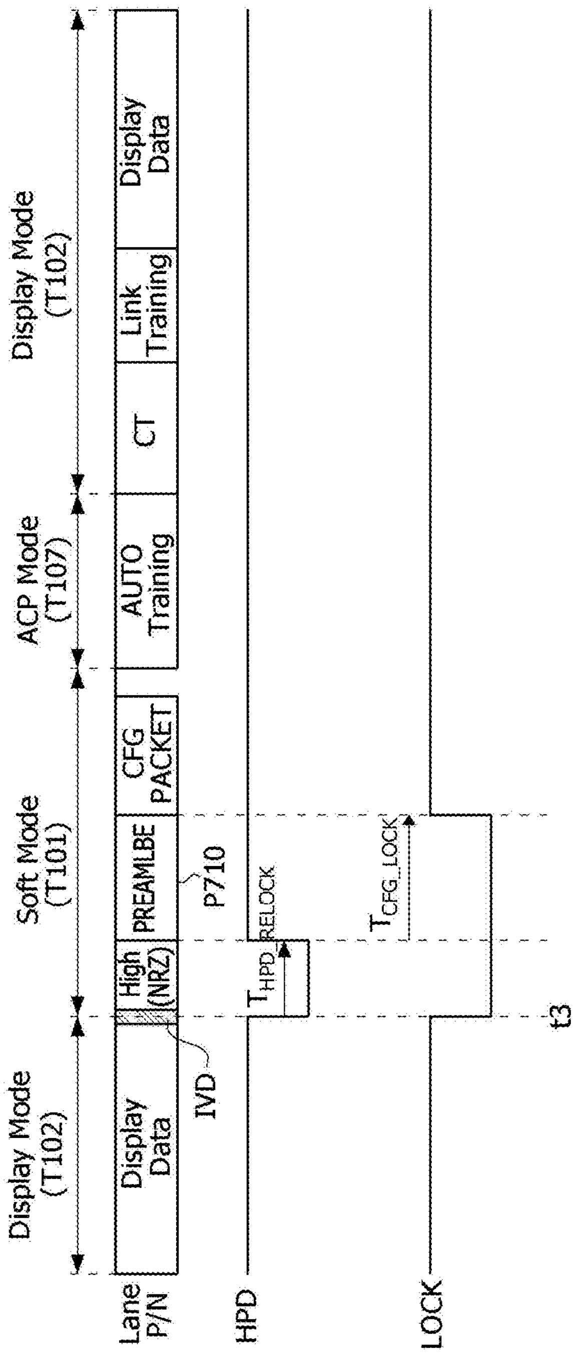
FIG. 18 is a diagram showing a first clock recovery sequence during a lock-fail in a display mode according to another embodiment of the present disclosure.

FIG. 17 illustrates a second clock recovery sequence during a lock-fail in the configuration mode according to another embodiment of the present disclosure. FIG. 18 illustrates a first clock recovery sequence during a lock-fail in the display mode according to another embodiment of the present disclosure.

Referring to FIG. 17, if a CRC error is detected or a lock-fail is recognized in the data driving device 120 during the configuration mode T101, the data driving device 120 may change the HPD signal and the lock signal to a low level (t1). After changing the HPD signal to a low level, the data driving device 120 may change it back to a high level after a predefined delay time THPD_RELOCK.

The data processing device 110 may recognize that the HPD signal and the lock signal are in a low-level state and, after a predefined delay, transmit the preamble pattern P710 to the data driving device 120. The data driving device 120 may perform training operations using the preamble pattern P710.

If the training is completed within a predefined time TCFG_RELOCK, the data driving device 120 may change the lock signal to a high level (t2).

Referring to FIG. 18, if a lock-fail occurs in the display mode T102 due to external noise or other factors, the data processing device 110 may change both the HPD signal and the lock signal to a low level (t3).

According to an embodiment, when a symbol error such as an 8B/10B code error, a data non-transmission error due to a watchdog timeout or the like occurs in the display mode T102, the lock recovery may be rapidly performed by the clock training through the first lock recovery mode as shown in FIG. 16, whereas when a cyclic redundancy check (CRC) error or a configuration CRC error occurs in frame data or line data, the second lock recovery mode as shown in FIG. 18 may be preferentially performed.

The data processing device 110 may recognize that the HPD signal and the lock signal are in a low-level state, output a high signal for a predefined period, and then restart the configuration mode T101.

The data driving device 120 may change the HPD signal from a low level to a high level after the delay time THPD_RELOCK. The data processing device 110 may recognize the level change of the HPD signal and resume operations. The data processing device 110 may retransmit the preamble pattern P710, and the data driving device 120 may perform training using the preamble pattern P710.

The data driving device 120 may change the lock signal to a high level once the training of the preamble pattern P710 is completed. Subsequently, it may optionally perform the auto compensation mode (AUTO Compensation Mode) T107. The auto compensation mode is performed during the initial stage after power-on and may not be performed during subsequent lock recovery sequences.

According to the embodiment, in abnormal operation conditions requiring lock recovery, there is an advantage in being able to choose whether to retrain using the preamble pattern P710 of the configuration mode T101 or the clock training pattern P730 of the display mode T102. Additionally, this selection may be made using the existing HPD line and LOCK line without requiring additional lines.

The following embodiments may be combined or associated with each other in whole or in part, and various types of interlocking and driving are technically possible. The embodiments may be implemented independently of each other or together in an interrelated relationship.

Although the embodiments of the present disclosure have been described in more detail with reference to the accompanying drawings, the present disclosure is not necessarily limited to such embodiments, and may be variously modified within the scope thereof without departing from the technical spirit of the present disclosure. Therefore, the embodiments disclosed in the present disclosure are provided for illustrative purposes only and are not intended to limit the technical concept of the present disclosure, and the scope of the technical concept of the present disclosure is not limited thereto. Therefore, it should be understood that the embodiments described above are illustrative in all aspects and do not limit the present disclosure.

DESCRIPTION OF REFERENCE NUMERALS

110: Data processing device
120: Data driving device

What is claimed is:

1. A data processing device, wherein the data processing device is configured to:
- transmit configuration data in a low-speed communication mode;
- transition to a high-speed communication mode after the low-speed communication mode and transmitting control data and image data;
- retransmit a clock training pattern while maintaining the high-speed communication mode when a lock-fail signal is received during operation in the high-speed communication mode; and
- when the lock signal for the retransmitted clock training pattern is not received within a predefined time, the low-speed communication mode is re-executed.

2. The data processing device of claim 1, wherein:
- the clock training pattern is transmitted to enter the high-speed communication mode after the low-speed communication mode; and
- the clock training pattern is retransmitted while maintaining the high-speed communication mode when a lock-fail signal is received during the transmission of image data after receiving a lock signal indicating completion of training for the clock training pattern.

3. The data processing device of claim 1, wherein:
- when the low-speed communication mode is re-executed, a preamble pattern is retransmitted.

4. The data processing device of claim 1, wherein:
- before retransmitting the clock training pattern, a recovery start signal is transmitted, and
- the recovery start signal is a signal in which high and low levels are alternately repeated.

5. The data processing device of claim 1, wherein:
- before retransmitting the clock training pattern, a recovery start signal is transmitted, and
- the recovery start signal is a DC signal of either a high level or a low level.

6. The data processing device of claim 1, wherein:
- when power is supplied, the low-speed communication mode is activated to transmit a preamble pattern, followed by transmitting the configuration data, and
- when a lock signal for the preamble pattern is received, the configuration data is transmitted, and the high-speed communication mode is activated if the lock signal is continuously received.

7. The data processing device of claim 1, wherein:
- when a lock signal for the clock training pattern is received, a link training pattern is transmitted.

8. A data driving device, wherein the data driving device is configured to:
- receive configuration data in a low-speed communication mode;
- receive control data and image data in a high-speed communication mode after the low-speed communication mode; and
- when a lock-fail is detected during operation in the high-speed communication mode, transmit a lock-fail signal to the data processing device, and perform training by receiving a recovery start signal and a clock training pattern while maintaining the high-speed communication mode;
- when power is supplied, the low-speed communication mode is activated to receive a preamble pattern;
- after a lock signal for the preamble pattern is transmitted, the configuration data is received; and
- the high-speed communication mode is activated by continuously transmitting the lock signal.

9. The data driving device of claim 8, wherein:
- the data driving device comprises a plurality of devices, and each data driving device includes a lock detector.

10. A display device comprising:
- a data processing device configured to transmit configuration data in a low-speed communication mode, to transition to a high-speed communication mode after the low-speed communication mode to transmit control data and image data, and to retransmit a recovery start signal and a clock training pattern while maintaining the high-speed communication mode when a lock-fail signal is received during the high-speed communication mode; and
- a data driving device configured to receive the recovery start signal and the clock training pattern and perform training,
- a first communication line configured to transmit the image data;
- a second communication line configured to transmit and receive the lock signal; and
- a third communication line configured to detect an interface connection between the data processing device and the data driving device, wherein the data driving device is configured to change a signal level of at least one of the third communication line and the second communication line when a lock-fail signal is received while operating in the high-speed communication mode.

11. The display device of claim 10, wherein:

the data processing device transmits a clock training pattern to enter the high-speed communication mode after the low-speed communication mode; and when a lock-fail signal is received during the transmission of image data after receiving a lock signal indicating completion of training for the clock training pattern, the data processing device retransmits the clock training pattern while maintaining the high-speed communication mode.

12. The display device of claim 10, wherein the data driving device maintains a signal level of the third communication line at a high level and changes a signal level of the second communication line to a low level when a lock-fail signal is received while operating in the high-speed communication mode.

13. The display device of claim 10, wherein the data driving device changes a signal level of the third communication line and a signal level of the second communication line to a low level when a lock-fail signal is received while operating in the high-speed communication mode.

14. The display device of claim 10, wherein the data driving device changes a signal level of the third communication line and a signal level of the second communication line to a low level when a lock-fail signal is received while operating in the low-speed communication mode.

* * * * *